Dec. 27, 1966    E. J. MENNICKEN ET AL    3,294,074
SUPPLEMENTAL AIR SUPPLY DEVICE

Original Filed Sept. 30, 1963                   2 Sheets-Sheet 1

INVENTORS
ERWIN J. MENNICKEN
FRANZ MUTH
BY KURT H. STREHLE
Jacobi & Davidson
ATTORNEYS Dec. 27, 1966   E. J. MENNICKEN ET AL   3,294,074
SUPPLEMENTAL AIR SUPPLY DEVICE
Original Filed Sept. 30, 1963   2 Sheets-Sheet 2

Erwin J. Mennicken
Franz Muth
Kurt H. Strehle
INVENTORS

BY Jacobi & Davidson
ATTORNEYS

United States Patent Office 3,294,074
Patented Dec. 27, 1966

3,294,074
SUPPLEMENTAL AIR SUPPLY DEVICE
Erwin J. Mennicken, Reinbek, near Hamburg, Franz Muth, Hamburg-Blankenese, and Kurt H. Strehle, Schonningstedt, near Hamburg-Bergedorf, Germany, assignors to Filtrona Filter G.m.b.H., Glinde, near Hamburg, Post Reinbek, Germany, a corporation of Germany
Original application Sept. 30, 1963, Ser. No. 312,664, now Patent No. 3,224,424, dated Dec. 21, 1965. Divided and this application Sept. 28, 1965, Ser. No. 490,838
Claims priority, application Germany, Jan. 31, 1963, F 38,885
4 Claims. (Cl. 123—124)

This application is a division of our co-pending application Serial No. 312,664, filed September 30, 1963, now U.S. Patent No. 3,224,424.

This invention relates to a supplemental air supply device and more particularly it relates to a device adapted to be connected to the carburetor of an internal combustion engine for controlling introduction of a supplemental air supply into the carburetor to assure complete combustion of the combustible mixture therein.

It is well known that the exhaust gases from internal combustion engines contain certain toxic components, primarily carbon monoxide and polycyclic hydrocarbons. A variety of different proposals have been suggested for reducing the content of these toxic components in engine exhaust gases, but for the most part, these proposals have related to a treatment of the exhaust gases after they have left the combustion chamber or engine cylinders. Thus, some of these proposals have related to "afterburning," a process wherein the exhaust gases are re-ignited by means of a spark plug or the like in an attempt to accomplish complete combustion. Other such proposals have suggested the use of chemical catalysts in an attempt to promote combustion of the exhaust gases. All of these prior proposals have not proved satisfactory, however, since they are, at best, incomplete in their effect and also since they cause a deterioration in the performance of the engine. Additionally, these prior proposals have involved considerable expense in that the equipment is either complicated, or the chemical catalysts which are utilized are quickly exhausted and must be continually replenished.

Moreover, these prior art proposals for treating engine exhaust gases are extremely inefficient when the engine is merely in an idle condition and not accelerating, yet this is the condition where the content of toxic components in the exhaust gases exercise their most deleterious effect, as a result of their increasing concentration in the atmosphere.

The present invention represents a departure from prior art proposals and technology, and does so by providing a quantity of additional air to the combustible mixture in the carburetor, thereby assuring complete combustion of such combustible mixture and thus materially reducing the unburnt and toxic components in the exhaust gases. More particularly, the quantity of additional air supplied to the carburetor is varied in an inverse proportion to the r.p.m. of the engine. That is, when the engine is in idling condition and is thus operating at a relatively low r.p.m., the quantity of additional or supplemental air supplied to the carburetor is a maximum. As acceleration takes place, and the r.p.m. of the engine gradually increases, the quantity of supplemental or additional air supply to the carburetor gradually diminishes. When the r.p.m. of the engine reaches some particular predetermined level, the quantity of additional air is completely interrupted and the supplemental air supply to the carburetor is terminated.

With the foregoing matter firmly in mind, it is, therefore, an object of the present invention to overcome the difficulties and deficiencies associated with prior art proposals for assuring complete combustion of engine exhaust gases, and to provide in their stead, a simple and efficient device for accomplishing this purpose.

Another object of the present invention is to provide a supplemental air supply device adapted to be connected to the carburetor of an internal combustion engine for controlling introduction of a supplemental air supply thereinto, thereby assuring complete combustion of the combustible mixture within the carburetor.

Another object of the present invention is to provide a supplemental air supply device for supplying an additional quantity of air to the carburetor associated with an internal combustion engine, and wherein such device supplies such additional air at a proportionate rate which varies inversely to the r.p.m. of the engine.

Another object of the present invention is to provide a supplemental air supply device for supplying an additional quantity of air to a carburetor, wherein centrifugal force is utilized to control the quantity of such additional air supply.

Another object of the present invention is to provide a supplemental air supply device which is relatively inexpensive to produce, yet which is efficient in its operation and which produces the desired result referred to hereinabove.

Other objects, advantages and salient features of the present invention will be apparent from the following detailed description, which, taken in conjunction with the annexed drawing, discloses a preferred embodiment thereof.

Referring to the drawing.

Figure 1:
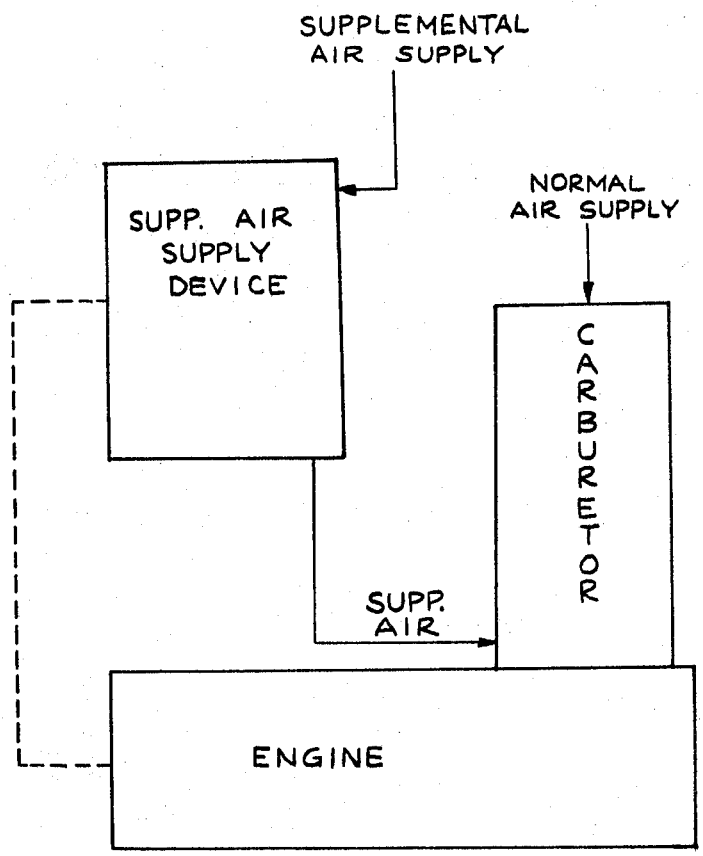
FIGURE 1 is a diagrammatic view of the present invention.
Figure 2:
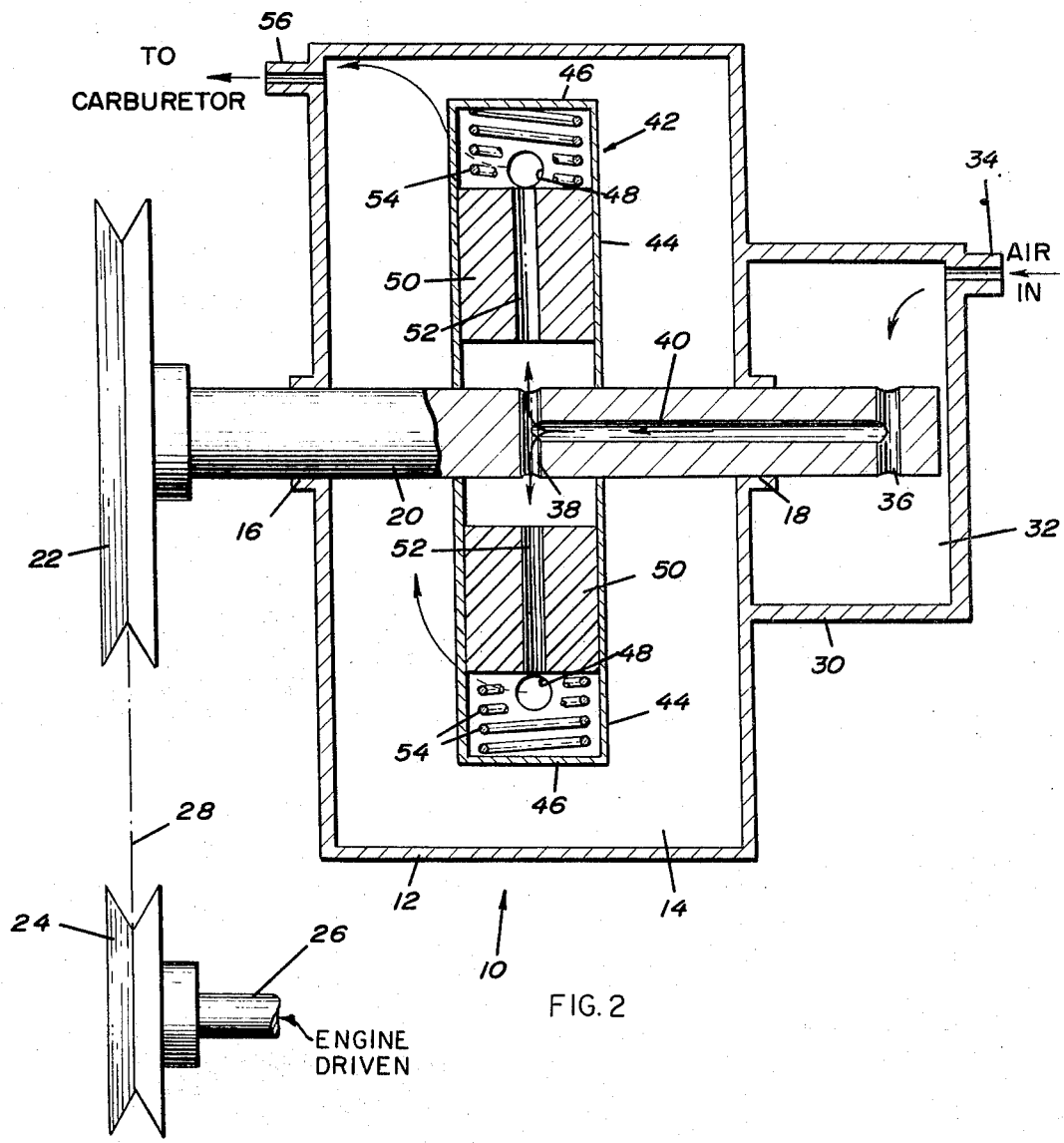
FIGURE 2 is a sectional view through a supplemental air supply device in accordance with the principles of the present invention.

The device itself is generally designated 10 and includes a hollow casing 12 having an internal chamber 14. A pair of axialy aligned apertures 16 and 18 are formed in opposed walls of the casing 12 to receive and rotatably mount an axially elongated shaft means 20.

One end of the shaft means 20 projects beyond the walls of the casing and a pulley 22 is mounted thereon. The pulley 22 is aligned in spaced relation with another pulley 24 attached to a shaft 26. A belt, not shown, interconnects the pulleys 22 and 24 along an axis designated 28.

The shaft 26 is either the main shaft of the internal combustion engine with which the device 10 is associated, or is an auxiliary shaft which is driven by the main shaft. As such, the shaft 26 is driven at a specified number of revolutions per minute (r.p.m.) which varies as the operating conditions of the engine vary. Since the shaft means 20 is connected to the shaft 26 by the aforementioned belt and pulley arrangement, it should be apparent that rotation of the shaft means 20 is responsive to rotation of the shaft 26. That is, as the r.p.m. of the shaft 26 increases, the r.p.m. of the shaft means 20 likewise increases.

The opposite end of the shaft means 20 projects beyond the walls of the casing 12 and into an inlet housing 30 having an internal chamber 32. An inlet opening 34 communicates with the chamber 32 to permit introduction of a supplemental air supply. A radial bore 36 extends through that portion of the shaft means disposed within the chamber 32, and another radial bore 38 extends through that portion of the shaft means disposed within the chamber 14. An axial bore 40 is formed within the shaft means 20, with such axial bore extending between the radial bores 36 and 38 to thereby communicate one with the other.

A centrifugal operating mechanism generally designated 42 is attached to the shaft means 20 within the chamber 14, whereby such centrifugal operating mechanism will be rotated concurrently with said shaft means. The centrifugal operating mechanism includes at least one, and preferably more than one, cylindrical body 44 which extends radially from the shaft means 20 in surrounding relationship to the radial bore 38. An end wall 46 closes off the cylindrical body at the end thereof spaced from the shaft means 20 and holes or aperture means 48 are formed within the cylindrical body between the shaft means 20 and the end wall 46.

Each cylindrical body 44 is formed as an elongated hollow member and a centrifugally movable means or piston 50 is slidably mounted therewith. A longitudinal bore 52 extends through each piston 50 and a spring means 54 is interposed between the outer surface of each piston 50 and the end wall 46.

In operation, the device 10 is connected to the carburetor associated with the internal combustion engine, with such connection extending from an outlet opening 56 formed in the casing 12 and communicating with the chamber 14. When the engine is operating at idling conditions, at a relatively low r.p.m., the shaft means 20 is likewise rotating at a relatively slow r.p.m. and the centrifugal force created by such rotation tends to cause a slight radially outward movement of the pistons 50. However, the springs 54 counteract the centrifugal force caused by rotation, and thus during such idling speeds, the pistons 50 assume a position somewhat as shown in the drawing. In such position, the supplemental air supply introduced through the opening 34 traverses through the bores 36, 40 and 38 of the shaft means 20 and enters the centrifugal operating mechanism 42. The supplemental air can then flow through the bores 52 in the pistons 50, and can exit through the holes or apertures 48 and into the internal chamber 14 in the casing 10. As the supplemental air fills the casing 10, it exits therefrom through the outlet aperture 56 and is supplied to the carburetor wherein it mixes with the combustible mixture flowing through the carburetor to assure complete combustion thereof.

As the engine starts to accelerate, the r.p.m. of the shaft 26 is increased and the r.p.m. of the shaft means 20 is likewise increased, thereby creating an increased centrifugal force moving the pistons radially outwardly. As this centrifugal force increases, it overcomes the counteracting form of the springs 54, and moves the pistons toward the end walls 46. Gradually, the pistons 50 will cover the aperture means 48 thereby decreasing their effective size and thus decreasing the amount of supplemental air which is supplied to the chamber 14 and ultimately to the carburetor. Eventually, when the r.p.m. of the shaft means 20 reaches a predetermined level, the pistons 50 will completely cover the aperture means 48, thereby completely interrupting and terminating the supplemental air supply to the carburetor.

When the r.p.m. of the engine again drops back to idling condition, the centrifugal force on the pistons 50 is reduced and such pistons tend to move back toward the shaft means 20, thereby again uncovering the aperture means 48, and thus again re-establishing the supplemental air supply to the carburetor.

The shape of the aperture means 48 can be so designed so that such aperture means become closed progressively in the course of outward movement of the pistons 50 during increased r.p.m. of the engine. Alternatively, the aperture means 48 can be designed so that they are closed immediately and completely without any preliminary closing or throttling action and so that the supply of supplemental air is cut off substantially instantaneously. This latter design can be particularly advantageous in avoiding any loss of performance of the engine in the high r.p.m. range.

After reading the foregoing detailed description, it will be apparent that the objects set forth at the outset of the specification have been successfully achieved by the present invention. Accordingly, what is claimed is:

1. In the combination of an internal combustion engine and a carburetor for supplying a combustible mixture to said internal combustion engine, said carburetor including means supplying a normal quantity of air to form a part of said combustible mixture, means for providing controlled introduction of a supplemental quantity of air into said mixture sufficient to assure complete combustion of said combustible mixture, said means comprising:

a hollow casing having an internal chamber and an outlet opening communicating with said chamber and connected to said carburetor;

shaft means having at least one end thereof projecting beyond said casing;

means coupling said one end of said shaft means to a revolving shaft in said internal combustion engine whereby said shaft means is rotated at the same speed of revolution as said revolving shaft;

a centrifugal operating mechanism disposed within said internal chamber and attached to said shaft means for concurrent rotation therewith;

means for introducing air into said centrifugal operating mechanism;

said centrifugal operating mechanism including aperture means communicating with said internal chamber and centrifugally movable means operative to progressively close said aperture means;

said centrifugally movable means including piston means movable toward said aperture means and compensated spring means normally biasing said piston means away from said aperture means;

said introduced air within said centrifugal operating mechanism being transferred, as said engine is idling, through said casing outlet opening and to said carburetor to supplement said normal carburetor air supply;

said shaft means being rotated faster when the speed of revolution of said engine shaft is increased from an idling condition, to thereby operate said centrifugally movable means to gradually overcome the biasing effect of said spring means and to progressively close said aperture means until the same are completely closed, thereby terminating the supply of supplemental air to said carburetor;

said spring means being so compensated and correlated with the weight of said piston means to assure that said supplemental air supply will gradually diminish at a preselected rate and will be completely terminated when a predetermined speed is reached.

2. The combination defined in claim 1 wherein said means coupling said one end of said shaft to a revolving shaft includes a pulley mounted on the end of said shaft means, a further pulley mounted on the end of said revolving shaft, said pulley and further pulley being disposed in coplanar relationship, and a belt drive means directly coupling said pulley and further pulley whereby said shaft means is driven in unison with said revolving shaft.

3. The combination defined in claim 1 wherein said means for introducing air into said centrifugal operating mechanism includes first and second radial bore means in said shaft means, and axial bore means extending therebetween, said first radial bore means communicating with the atmosphere and said second radial bore means communicating with said centrifugal operating mechanism, whereby atmospheric air enters said first radial bore, traverses said axial bore, exits from said shaft means through said second radial bore and passes to said aperture means.

4. The combination defined in claim 3 wherein said piston means include central bore means in alignment with said second radial bore means.

References Cited by the Examiner

UNITED STATES PATENTS

| | | | |
|---|---|---|---|
| 1,035,641 | 8/1912 | Stewart. | |
| 1,212,745 | 1/1917 | Crockett | 123—123 |
| 1,486,219 | 3/1924 | Adams | 123—124 |
| 1,598,243 | 8/1926 | Chapin | 123—123 |
| 2,045,719 | 6/1936 | Munro | 123—124 |
| 2,416,110 | 2/1947 | Mallory | 123—103 |
| 2,521,736 | 9/1950 | Mallory | 123—103 |
| 3,139,079 | 6/1964 | Bettoni | 123—103 |

MARK NEWMAN, *Primary Examiner.*

AL LAWRENCE SMITH, *Examiner.*